(No Model.)
J. MENZIES.
STERN TUBE BUSHING FOR PROPELLER SHAFTS.
No. 370,802. Patented Oct. 4, 1887.
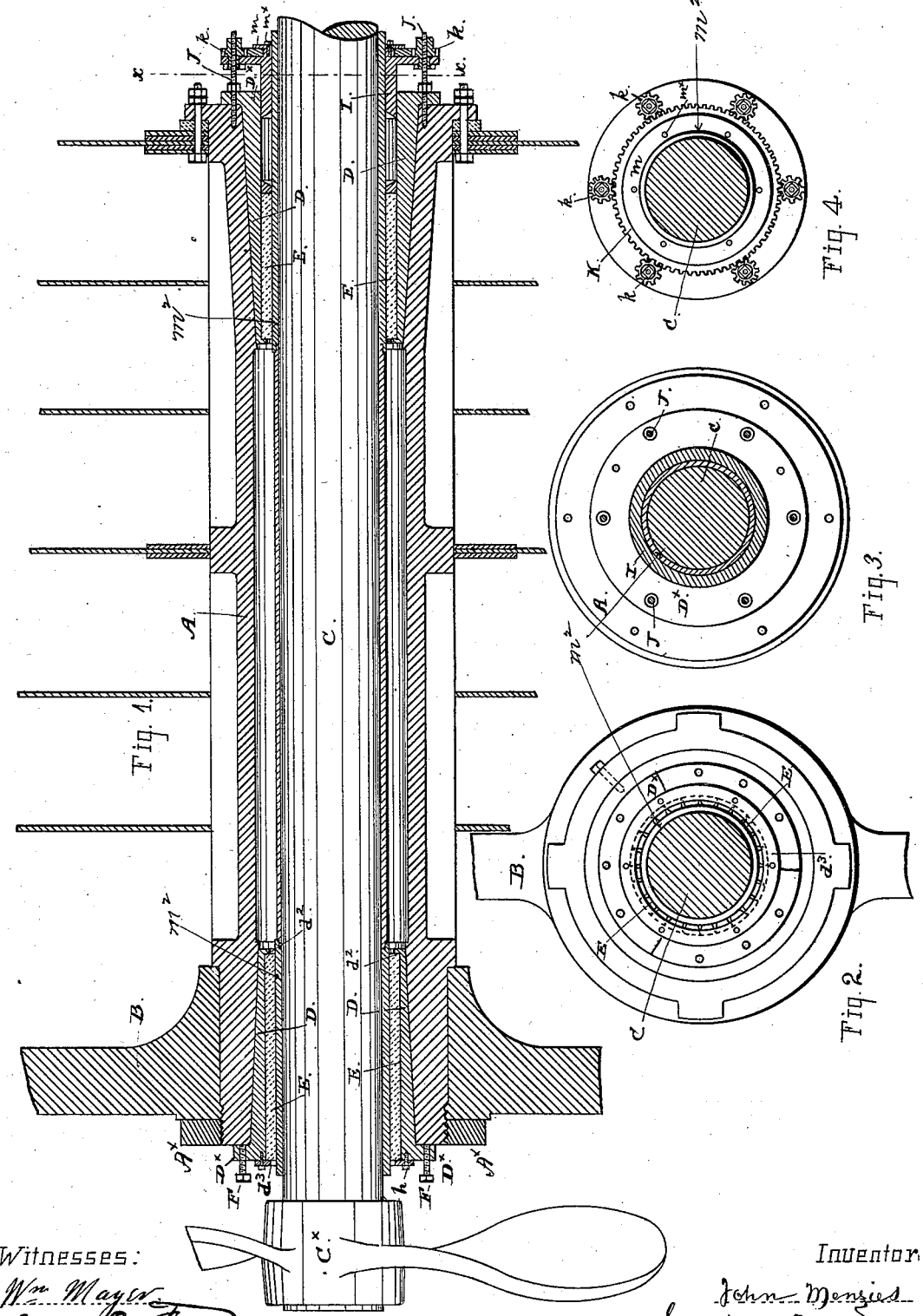
Witnesses:
Wm Mayer
Joseph E. Tod
Inventor
John Menzies
By Smith & Osborn
Attys

UNITED STATES PATENT OFFICE.

JOHN MENZIES, OF SAN FRANCISCO, CALIFORNIA.

STERN-TUBE BUSHING FOR PROPELLER-SHAFTS.

SPECIFICATION forming part of Letters Patent No. 370,802, dated October 4, 1887.

Application filed June 28, 1887. Serial No. 242,808. (No model.)

*To all whom it may concern:*

Be it known that I, JOHN MENZIES, a citizen of the United States, residing in the city and county of San Francisco, and State of California, have invented certain new and useful Improvements in Stern-Tube Bushings for Propeller-Shafts; and I do hereby declare that the following is a full, clear, and exact description of my said invention, reference being had to the drawings that form a part of this specification.

My invention relates to improvements in bushings for propeller-shafts of steamships.

As constructed and fitted heretofore, the bushings at the inner and the outer ends of the stern-tube could not be repaired without putting the ship into dock, as it was necessary to remove the propeller and draw in the tail-shaft before the bushings could be removed; also, to carry on the work access must have been given to these parts by removing the cargo in the after hold.

My invention is designed to overcome the difficulties attending and limiting this work of repairing the bearings in stern-tubes; and it consists in certain improved construction and combination of taper bushings, as hereinafter described, whereby the bearings can be repaired or new bushings fitted without going into dock.

The following description fully explains the nature of my said invention and the manner in which I proceed to produce and carry out the same, the accompanying drawings being referred to by figures and letters.

Similar letters of reference indicate like parts in the several views.

Figure 1 is a sectional view taken longitudinally through a stern-tube and stern-post to which my improved bushings are fitted. Fig. 2 is an end view from the outer end of the stern-tube. Fig. 3 is a transverse section taken at the line $x\,x$, Fig. 1. Fig. 4 is an end view from the right-hand side of Fig. 1.

A represents the stern-tube, and B the stern-post, of the ship.

C is the tail-shaft, having the propeller $C^\times$ on the outer end and extending through the stern-tube in the usual manner into the tunnel, (not shown,) where it is coupled to the engine-shaft. (Not shown.)

D D are sleeves, and E E bearings of wood, which are set around the casing $M^2$ of the shaft, between it and the inner face of the sleeves, to take the wear. The sleeves D D are formed in sections tapering outwardly, with inner bearings of lignum-vitæ segments surrounding the shaft. The bore of the stern-tube at each end is likewise tapered for a suitable distance in corresponding degree, and the sleeves fitted to the taper in each end of the stern-tube have screws F F and screws J J, taking into the tube through the flanges $D^\times$ on the sleeves D D. The segments of lignum-vitæ inserted between the sleeves and the casing of the tail-shaft are confined in place by a shoulder, $d^2$, at the inner ends of the sleeves, and a ring, $d^3$, on the outside sleeve, that is fixed by screws $h\,h$ against the head of the said sleeve. The segments are thus confined within the sleeve, and are drawn out or forced into the tube as the sleeve is moved. The construction of the sleeve at the inner end of the stern-tube is the same; but, in addition to the bearings of wood, a gland, I, is fitted into the sleeve, which is made longer for this purpose, and the packing of this gland is placed in front of the segments. The screws J of this gland take through the flange $D^\times$ of the inner sleeve and into the end of the stern-tube, and are connected with one another by pinions $k\,k$ and a toothed ring, K, a pinion being fixed on each screw, and the revolving ring K being held in place against the head of the gland by a ring, M, fixed by screws $M^*\,M^*$.

I have found in practice that a taper of about three-fourths of an inch to the foot in length of the sleeve, will work well; but I do not limit myself to this degree of taper. When applied as thus described, the sleeves can be drawn back and turned around to reverse the position of the lignum-vitæ strips, or new strips can be inserted within the sleeves. In this operation it is only necessary to take up the weight of the propeller and the tail-shaft by jack-screws and draw back the outer sleeve by means of the screws F, and as this can be done without disconnecting the tail-shaft the ship need not be put into dock.

A collar, $A^\times$, is preferably screwed upon the stern-tube outside of the stern-post, as shown in Fig. 1.

Having thus fully described my invention, what I claim, and desire to secure by Letters Patent, is—

1. In a propeller, the combination, with the shaft and a casing therefor, of the stern-tube having an internal taper at its ends, and sleeves with external tapers fitting in between said casing and tapering portions of the tube, and means for moving the sleeves, substantially as set forth.

2. The combination, with the stern-tube having a taper bore at the inner end, of a taper sleeve, D, bearing E, gland I, screws J, pinions $k$, and gear-ring K, substantially as set forth.

In testimony that I claim the foregoing I have hereunto set my hand and seal.

JNO. MENZIES. [L. S.]

Witnesses:
JAMES L. KING,
STEWART MENZIES.